United States Patent [19]
Smith

[11] Patent Number: 6,124,397
[45] Date of Patent: Sep. 26, 2000

[54] VINYL ACETATE COPOLYMER EMULSIONS STABILIZED BY POLY(ETHYLENE GLYCOL)-DIEPOXIDE ADDUCTS

[75] Inventor: Carrington Duane Smith, Milford Square, Pa.

[73] Assignee: Air Products and Chemicals, Inc., Allentown, Pa.

[21] Appl. No.: 09/028,687

[22] Filed: Feb. 24, 1998

[51] Int. Cl.⁷ ..................................... C08L 31/04
[52] U.S. Cl. .......................... 524/832; 526/209; 526/210; 526/330; 526/331
[58] Field of Search .................... 524/832, 524, 524/459; 526/209, 210, 330, 331

[56] References Cited

U.S. PATENT DOCUMENTS

| | | | |
|---|---|---|---|
| 3,708,388 | 1/1973 | Lindemann et al. | 161/247 |
| 4,043,961 | 8/1977 | Beresniewicz et al. | 260/29.6 WA |
| 4,267,090 | 5/1981 | Heimberg et al. | 260/29.6 R |
| 4,287,329 | 9/1981 | Heimberg | 526/202 |
| 4,415,682 | 11/1983 | Becker | 523/403 |
| 4,542,182 | 9/1985 | Schuppiser et al. | 524/563 |
| 4,921,898 | 5/1990 | Lenny et al. | 524/459 |
| 5,124,394 | 6/1992 | Lenney | 524/459 |
| 5,459,180 | 10/1995 | Pfeil | 523/403 |
| 5,612,394 | 3/1997 | Pfeil et al. | 523/403 |

*Primary Examiner*—David W. Wu
*Assistant Examiner*—Kelechi Egwim
*Attorney, Agent, or Firm*—Russell L. Brewer

[57] ABSTRACT

This invention relates to improved vinyl acetate-based polymers which are formed by emulsion polymerizing vinyl acetate and other comonomers under conditions of free radical polymerization. The improvement resides in the stabilizer system, the stabilizer being a condensation product of a polyol having a weight average molecular weight of from 500 to 10,000 reacted with a diepoxide. An example is the reaction product of polyethylene glycol and the diglycidyl ether of Bisphenol A.

9 Claims, No Drawings

VINYL ACETATE COPOLYMER EMULSIONS STABILIZED BY POLY(ETHYLENE GLYCOL)-DIEPOXIDE ADDUCTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Stabilization of vinyl acetate and particularly vinyl acetate/ethylene copolymers prepared by aqueous emulsion polymerization is typically achieved by the use of surfactants and/or colloidal additives. Surfactants typically consist of ethoxylated alkyl phenols while colloidal additives such as the various grades of poly(vinyl alcohol) (PVOH) and hydroxyethyl cellulose are normally employed in tandem with surfactants. In many cases, the use of such traditional surfactants and/or poly(vinyl alcohol)s singly or in tandem results in drawbacks, such as lack of water resistance, lowered adhesion to certain substrates, little resistance to blocking phenomena which occurs in various coating and non-woven applications, etc.

The following patents are representative of emulsion polymerization processes for vinyl acetate:

U.S. Pat. No. 3,708,388 discloses the preparation of vinyl acetate-ethylene adhesive compositions stabilized by hydroxyethyl cellulose/surfactant mixtures or poly(vinyl alcohol) protective colloids.

U.S. Pat. No. 4,043,961 discloses vinyl acetate-ethylene emulsion compositions prepared in the presence of a protective colloid consisting of a poly(vinyl alcohol)-poly(methyl methacrylate) copolymer, of which about 1–10% by weight is methyl methacrylate.

U.S. Pat. No. 4,267,090 and U.S. Pat. No. 4,287,329 discloses a process for preparing vinyl acetate-ethylene compositions by polymerizing vinyl acetate and ethylene in the presence of (a) 1–2% based on total monomer of a surfactant and (b) a protective colloid consisting of essentially partially hydrolyzed poly(vinyl alcohol).

U.S. Pat. No. 4,542,182 discloses vinyl acetate-ethylene emulsions containing a protective colloid. These comprise a water-soluble polymer containing (a) at least one monomer selected from the group consisting of N-methylolacrylamide and N-methylolmethacrylamide and (b) a water soluble polymer of ethylene glycol having a molecular weight between 1,000 and 50,000.

U.S. Pat. No. 4,921,898 discloses the preparation of a high solids vinyl acetate-ethylene emulsion compositions by polymerizing vinyl acetate and ethylene in the presence of a stabilizing amount of a PVOH/surfactant system consisting essentially of a PVOH having a 100–600 degree of polymerization and a nonionic surfactant consisting of a 30–40 ethylene oxide unit substituted alkyl phenol or a 30–40 ethylene oxide unit substituted propylene glycol.

U.S. Pat. No. 5,124,394 discloses the preparation of vinyl acetate-ethylene emulsion compositions in the presence of a stabilizing and effective amount of essentially poly(ethyloxazoline).

U.S. Pat. No. 5,612,394 discloses aqueous epoxy resin dispersions based upon an epoxy resin, a dispersant, a polymer derived from ethylenically unsaturated monomers, and an amine curing agent. Aqueous epoxy dispersions comprised of 1) a mixture of a prepolymer of an epoxy resin formed by reacting an epoxide with an aromatic phenol, and 2) a dispersant comprising the condensation product of a polyol, typically polyethylene glycol, and an epoxide equivalent is prepared, are dispersed in water and then ethylenically unsaturated monomers polymerized therein. Curing agents for the epoxide are then added to provide crosslinking. The examples at Cols. 15 and 16, disclose the homogenization of epoxy resin with ethylenically unsaturated monomers in a weight ratio from about 10 to 20% monomer to epoxy resin. This is followed by addition of a dispersant and water and, once homogenized, polymerization of the monomers is effected.

U.S. Pat. Nos. 4,415,682 and 5,459,180 discloses polyethylene glycol derivatives for use as dispersants for epoxy resins.

BRIEF SUMMARY OF THE INVENTION

This invention relates to improved vinyl acetate-based polymers and particularly to vinyl acetate-ethylene-based adhesives and coatings. These polymers are formed by emulsion polymerizing vinyl acetate and other comonomers under conditions of free radical polymerization in the presence of a stabilizer which is a condensation product of a polyalkylene glycol having a weight average molecular weight of from 500 to 10,000 g/mol reacted with a diglycidyl reactant. The vinyl acetate and optional comonomers, exclusive of the polyalkylene glycol/diglycidyl reaction product, generally constitutes at least 90% of the organic component in the emulsion.

There are significant advantages associated with the vinyl acetate-based polymers of this invention and particularly adhesives formed therefrom, and these include:

an ability to stabilize vinyl acetate-based polymers utilizing a small amount of a polyalkylene glycol/diglycidyl reactant as a stabilizer in place of conventional stabilizers such as polyvinyl alcohol and other nonionic and anionic surfactants;

an ability to produce high solids adhesive emulsions having low viscosity, e.g., less than 5000 centipoises at 25° C.;

an ability to produce vinyl acetate-based adhesives which are relatively freeze-thaw stable in comparison to conventionally stabilized vinyl acetate-based emulsions; and, an ability to form laminates which have enhanced adhesive wet strength compared to polyvinyl alcohol and nonionic surfactant stabilized vinyl acetate-based polymers.

BRIEF DESCRIPTION OF SEVERAL VIEWS OF THE DRAWINGS

Not Applicable

DETAILED DESCRIPTION OF THE INVENTION

The copolymers formed by the emulsion polymerization of vinyl acetate and comonomer are comprised of from 60 to 95% by weight vinyl acetate. The balance being a comonomer polymerizable with the vinyl acetate. Typically, the comonomer is ethylene and it is incorporated in an amount of from about 5 to 35% by weight to provide for a copolymer having a glass transition temperature (Tg) ranging from about −30° C. to 25° C. and generally from −20° C. to 10° C. Optionally, other comonomers may be polymerized with the vinyl acetate and examples of comonomers include ethylene, $C_{1-8}$ alkyl esters of acrylic and methacrylic acid, acrylonitrile, acrylamide; dialkyl esters of maleic esters and crosslinkable monomers such as N-methylolacrylamide. Representative $C_{1-8}$ alkyl esters of acrylic and methacrylic acid include methyl acrylate, methyl methacrylate, ethyl acrylate, butyl acrylate, 2-ethylhexyl acrylate. Examples of dialkyl esters of maleic acid include diethyl maleate and dibutyl maleate. A preferred vinyl acetate-based copolymer consists essentially of from about 85 to 90 wt % vinyl acetate and 10 to 15% by weight ethylene.

The stabilizer for the emulsion polymerization is based upon the employment of a condensation product of a polyalkylene glycol, preferably polyethylene glycol, and a diglycidyl compound. The polyalkylene glycols are preferably polyether-polyols that have weight average molecular weights (Mw) ranging from about 500 to 10,000 and preferably from about 3000 to 8000 grams per mole. Representative of the polyalkylene glycols are polyethylene glycols and polypropylene glycols. Polyethylene glycols are the preferred polyol for forming the stabilizer.

The diglycidyl compounds which are reacted with the polyalkylene glycols are based upon diglycidyl ethers of dihydric phenols and diglycidyl esters of polycarboxylic acids such as diglycidyl esters of succinic acid, adipic acid, glutaric acid, and so forth. Preferred diepoxides are the glycidyl ethers of Bisphenol A and Bisphenol F. They will have an epoxy equivalent of from about 100 to 2000, and, preferably, between 100 and 350. Optionally, some glycidyl compounds may have greater than 2 functionality. Polyglycidyl esters may also be used, these being formed by the reaction of epichlorohydrin and a polycarboxylic acid, e.g., adipic acid, glutaric acid, and so forth.

A preferred general class of stabilizers for emulsion polymerization within the scope of the above description is based upon the polycondensation of poly(ethylene glycol)s with diepoxides. Procedures for the preparation of these types of materials are reported in U.S. Pat. No. 4,415,682 and U.S. Pat. No. 5,459,180 and are incorporated by reference. A representative structure is as follows:

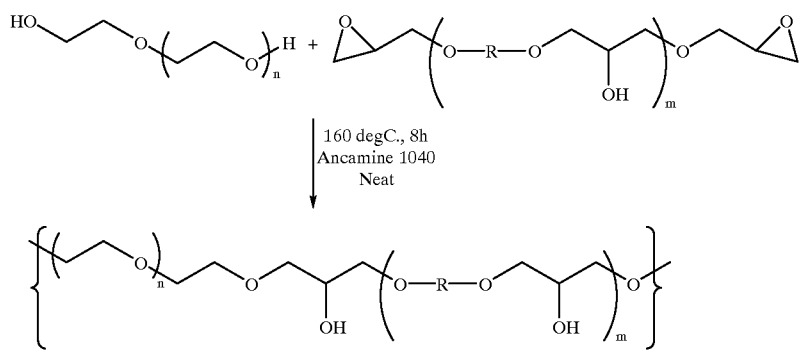

where R in the above formula represents the hydrophobic portion of the diglycidyl ether or ester, typically a Bisphenol A residue. One example of a class of stabilizers used for stabilizing the emulsion is commercially available and is comprised of from (approximately) 2 moles polyethylene glycol (PEG-8000) and 1 mole of a diepoxide based on a diglycidyl ether of Bisphenol-A. An approximate chemical structure is shown below.

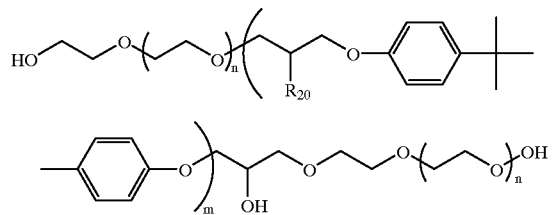

where n=ca. 150–200 and m=ca. 1 to yield a total weight average molecular weight of approximately 17,500 g/mole.

The stabilizer based upon the condensation product of the polyalkylene glycol and diepoxide for emulsion polymerization is used in an amount of from about 1 to 10% by weight of the vinyl acetate and the comonomers to be polymerized therein. Levels below about 1% by weight of the vinyl acetate and comonomers, without additional stabilizers, tend to result in unstable emulsions while levels in excess of 10% by weight, although suitable for stabilizing the emulsion, tend to detract from the properties of the vinyl acetate-based copolymers. Preferred stabilizing systems are free of surfactants and protective colloids and thus consist essentially of the reaction product of polyethylene glycol and diglycidyl ether in an amount from about 3–7% by weight.

Emulsion polymerization can be effected in a manner similar to that of other vinyl acetate-based emulsion polymerizations. The difference lies primarily in the substitution of the condensation product of the polyalkylene glycol and diepoxy compound for conventional stabilizers. For example, conventional catalysts based upon peroxides and reducing agents may be utilized. Redox systems based upon water-soluble oxidants such as hydrogen peroxide and tert-butyl-hydroperoxides and persulfates in combination with reducing agents such as sodium formaldehyde, sulfoxylate, ascorbic acid, and the like, are employed. Polymerization temperatures range from about 50 to 80° C. while pressures range from 0 to 2000 psig. The pressure during emulsion polymerization is in proportion to the ethylene incorporated into the copolymer. The pressure, therefore, is determined by the desired glass transition temperature of vinyl acetate/ethylene-based emulsions. Typical polymerization processes for the polymerization of vinyl acetate-based copolymers including vinyl acetate/ethylene copolymers are set forth in U.S. Pat. Nos. 5,084,503 and 5,110,856 which are incorporated by reference.

The following examples are provided to illustrated various embodiments of the invention.

EXAMPLE 1

Vinyl Acetate-Ethylene Emulsions Formed In The Presence Of A Diglycidyl Ether Of Bisphenol A And Polyethylene Glycol Adduct A 1 gallon stainless steel pressure reactor which had been purged with nitrogen was used in the reaction procedure. The reactor was charged with the mixture set forth in Table 1 and the delay compositions as set forth in Table 2 in accordance with the description to follow.

TABLE 1

| Material | grams |
|---|---|
| DI Water | 165.4 |
| Ferrous Ammonium Sulfate (1% aqueous solution) | 3.0 |
| Carbowax ® 20M Compound (9.5% Aqueous solution)* | 972.6 |
| 40% Phosphoric acid aqueous solution | 0.31 |
| Ethylene | 320 |
| Vinyl Acetate | 1500 |

*A commercially available material from Union Carbide - it is presumably formed by the condensation of Polyethylene glycol and a Bisphenol-A based diepoxide (Total nominal number. average molecular weight = 20,000).

TABLE 2

| Delay mixtures | |
|---|---|
| Material | Mass charged in grams |
| Aqueous 0.7% $H_2O_2$ | 110 |
| Aqueous 6.0% $H_2O_2$ | 57 |
| Aqueous 7.5% SFS | 114 |
| Ethylene | 25 |

The reactor was charged with an initial distilled water/Carbowax® 20M compound mixture and the pH was adjusted to 3.6 with phosphoric acid. Ferrous ammonium sulfate then was added and the initial aqueous solution was added. Next, agitation at 200 rpm was begun and the vinyl acetate charged. The reactor was purged again but with a nitrogen and ethylene mixture at 30 psi. The agitation was increased to 900 rpm and the mixture heated to 38° C. Ethylene was weighed and introduced subsurface into the reactor over a period of 45 min. Next, 7.0 mL of aqueous sodium formaldehyde sulfoxylate (SFS) solution was added midway through the ethylene charge. Fifteen minutes were allowed for equilibration or dissolution of the ethylene in the vinyl acetate. Addition of 0.7% hydrogen peroxide and 7.5% aqueous SFS were commenced at 0.3 ml/min. Once initiation occurred, the flow rate of the SFS solution was increased to 0.35 ml/min. and the temperature ramped to 65° C. over a 30 min period. Once at 65° C., the addition of dilute hydrogen peroxide was adjusted to maintain a 14° C. delta temperature between the reactor and the jacket (i.e., jacket temperature around 51° C.). Ethylene was added as a delay to maintain pressure. When the vinyl acetate free monomer content dropped to about 4%, the initiator was switched to an aqueous 6.0% $H_2O_2$, and the $H_2O_2$ and SFS addition rates were increased to 1.0 ml/min to complete the reaction. After the reaction was completed, the reaction was cooled to 30° C. and the pH adjusted to 5.3 with aqueous ammonium hydroxide. The polymerization product was transferred to a degasser and during transfer 0.5 gms Colloid 675 was added in a small amount of water. In the degasser, a solution of tert-butyl hydroperoxide (7.8 gms in 55 gms of water) was pumped in at a rate of 1.5 ml/min.

COMPARATIVE EXAMPLE 2

Vinyl Acetate-Ethylene Stabilized With PVOH

The procedure of Example 1 was repeated except that polyvinyl alcohol in an amount of 4% by weight of the total monomer was employed in place of the Carbowax® 20M PEG/diepoxide based stabilizer.

EXAMPLE 3

Comparative Properties And Adhesion Testing Of Emulsions

Emulsions prepared in Example 1 and 2 were tested for a variety of properties including adhesion. The results are set forth in Table 3.

TABLE 3

| Properties and Test Results: | Example 1 Carbowax 20M (5 weight % based on total monomer) | Example 2 Airvol 205 (3 weight % based on monomer) Airvol 523 (1 weight % based on monomer) |
|---|---|---|
| Accelerated Sediment % | 3 | 1.5 |
| Tg onset (deg C) | −5.1 | 2.4 |
| Tm (midpoint) (deg C) | 50 | none |
| Viscosity (60/12 RPM) (cps) | 220/325 | 1672/3200 |
| 100/325 mesh grit (ppm) | 102/76 | 129/16 |
| % solids | 55.3 | 54.9 |
| pH | 5.0 | 4.7 |
| Toluene Insolubles % | 53.8 | 70.3 |
| Cloth to cloth dry adhesion (pli)* | 8.6 ± 2.6 | 14.8 ± 1.0 |
| Cloth to cloth wet adhesion (pli) | 3.1 ± 0.5 | 1.4 ± 0.2 |
| Dry/Wet ratio (strength retention)% | 36 | 9.3 |
| PVC to cloth adhesion (pli) | 2.0 ± 0.7 | 2.8 ± 0.5 |
| Creep Resistance (mm/min) | 1.29 | 0.018 |
| Freeze Thaw Cycles | 5 | 0 |

*pli refers to pounds force per lineal inch.

Airvol is a trademark of Air Products & Chemicals, Inc. for use with polyvinyl alcohols.

In terms of emulsion properties, the emulsion of Example 1 displayed a lower viscosity and higher stability at 55% solids than did the emulsion of Example 2. This result was somewhat surprising since the emulsion of Example 2 is representative of commercial formulations which have enjoyed success because of stability and desired viscosity. Also, the Example 1 composition was freeze-thaw stable over a series of 5 cycles which was very unusual for vinyl acetate-ethylene latexes (VAE).

The adhesive wet strength of the Example 1 emulsion, particularly the wet adhesion as evidenced by the cloth to cloth wet adhesion and the dry/wet ratio, was dramatically increased over the conventional Example 2 PVOH stabilized VAE latex. On the other hand, the creep resistance and the PVC adhesion of the Example 1 polymer was not as good as the Example 2 polymer but was acceptable.

EXAMPLE 4

Vinyl Acetate-Ethylene Polymerized In Presence Of Polyethylene Glycol

The procedure of Example 1 was repeated except that a polyethylene glycol Homopolymer having a 20,000 Mn was substituted for the Carbowax® 20M compound. This material was nearly identical in terms of molecular weight to the Carbowax® 20M PEG/diepoxide adduct with the exception that there was no "hydrophobe"—the only chemical species present was the polyethylene glycol. When it was used as the sole stabilizer, the polymerization quickly resulted in high coagulum and could not be carried to completion to yield a useable product.

The result is important to show the necessity of employing stabilizers such as the one in Example 1 if one is to achieve stability in vinyl acetate polymerizations using relatively low levels of glycol/diepoxide stabilizers.

EXAMPLE 5

Preparation Of 4600 PEG-Diepoxide Polycondensate Stabilizer

Into a two liter glass reactor fitted with a mechanical stirrer, means for nitrogen gas purge, Dean Stark trap with condenser and addition port were added 200 gms Carbowax® PEG 4600 (Union Carbide Corp.) and 350 gms of toluene. This stirred mixture was brought to boiling temperature and residual water in the PEG was removed via the Dean Stark trap with a nitrogen purge. The mixture was cooled and 16.2 gms of diglycidyl ether of Bisphenol A sold under the trademark Epon® 828 (Shell Chemical Corp.) were added followed by additions of 1.0 gms Anchor® 1040 Curing Agent (Air Products and Chemicals, Inc.). The mixture was then brought to 165° C. with removal of toluene and held at that temperature for 12 hours. Next, the mixture was cooled to 90° C. and 300 gms water was added to produce a 40% solids solution of the PEG 4600 diepoxide polycondensate.

EXAMPLE 6

Ex 5 Polycondensate Stabilizer In VAE Polymerization

A VAE emulsion was prepared according to the procedure of Example 1 by substituting 231 gms of the 40% solids solution from Example 5 stabilizer for the Carbowax® compound 20M. Also, 907 gms water were in the initial charge instead of the 165.4 gms used in Example 1. Table 4 summarizes the properties of the resulting emulsion.

TABLE 4

| STABILIZER: | Example 4 (5 weight % based on total monomer) |
|---|---|
| Accel Seds % | 5 |
| Tg onset (deg C) | −7 |
| Tm (midpoint) (deg C) | 50 |
| Viscosity (60/12 RPM) (cps) | 420/450 |
| 100/325 mesh grit (ppm) | 98/40 |
| % solids | 60 |
| pH | 2.1 |
| Freeze Thaw Cycles | 5 |

Significant is the lower viscosity and higher stability vs. conventional PVOH stabilized VAE emulsion as in Example 2.

These results also show that effectiveness of a polyethylene glycol/diglycidyl ether of Bisphenol A reaction product as a stabilizer for vinyl acetate emulsion polymerization.

EXAMPLE 7

Preparation Of VAE Emulsion Costabilized With PVOH/PEG Diepoxide Condensate—2.5 Weight % Each On Total Monomer A costabilized VAE emulsion was prepared according to Example 1 by substituting 46.2 gms of the Carbowax® 20M Adduct and 462 gms of 10% aqueous Airvol® V-205 polyvinyl alcohol for the Carbowax® Compound 20M sole stabilizer. Also, 709.2 gms water were used in the initial charge instead of 165.4 gms used in Example 1. Table 5 summarizes the properties of the resulting emulsion.

TABLE 5

| STABILIZER: | Carbowax ® Compound 20M (2.5 weight % based on total monomer) + Airvol ® V-205(2.5 weight % based on total monomer) |
|---|---|
| Accel Seds % | 4 |
| Tg onset (deg C) | −1.6 |
| Tm (midpoint) (deg C) | v. small |
| Viscosity (60/12 RPM) (cps) | 1010/1406 |
| 100/325 mesh grit (ppm) | 146/202 |
| % solids | 60 |
| pH | 2.5 |
| Freeze Thaw Cycles | 5 |

EXAMPLE 8

Preparation Of VAE Emulsion Costabilized With PVOH/PEG Diepoxide Condensate 1.25% weight % PVOH/3.75 weight % PEG-diepoxide condensate A VAE emulsion was prepared according to Example 1 by substituting 69.3 gms of the Carbowax® 20M Compound and 229 gms of 10% aqueous Airvol® V-205 for the Carbowax® 20M Compound sole stabilizer. Also, 919 gms water was used in the initial charge instead of 165.4 gms used in Example 1. Table 6 summarizes the properties of the resulting emulsion.

TABLE 6

| STABILIZER: | Carbowax ® Compound 20 M (3.75 weight % based on total monomer) + Airvol ® V-205(1.25 weight % based on total monomer) |
|---|---|
| Accel Seds % | 5.5 |
| Tg onset (deg C) | −4.8 |
| Tm (midpoint) (deg C) | −50 |
| Viscosity (60/12 RPM) (cps) | 400/550 |
| 100/325 mesh grit (ppm) | 350/292 |
| % solids | 58 |
| pH | 2.25 |

Examples 7 and 8 show that the use of PVOH and PEG/diepoxide adducts in tandem for costabilizers in emulsion polymerization of vinyl acetate copolymers can be successful. Depending on the application of these emulsions, performance advantages may be observed by using these combination of stabilizers.

CONTROL EXAMPLE 9

Preparation Of VAE Terpolymer Emulsions For A Coatings Control Latex Stabilized With HEC—Surfactant System Control Latex The following is a general procedure for preparing VAE copolymer emulsions using a 1 gallon stainless steel pressure reactor: The reactor was charged with the following mixture:

| Material | Mass charged in grams |
| --- | --- |
| DI Water | 1000 |
| Ferric Ammonium Sulfate (5% aqueous solution) | 3.0 |
| 2% Natrosol ® 250LR | 100 |
| Igepal ® CO-887 | 43.7 |
| Igepal ® CO-630 | 10.4 |
| 50% Citric acid aqueous solution | 1.96 |
| Sodium Citrate | 1.0 |
| Monomer Mix (see delay table) | 190 |
| The following delay mixtures were utilized: | |
| Aqueous 1.0% t-BHP | 165 |
| Aqueous 2.5% sodium erythorbate | 165 |
| Monomer Mixture* | 1787 total composed of: |
| Vinyl Acetate | 1677 |
| Butyl Acrylate | 42 |
| Pluronic ® L-64 | 17 |
| Pluronic F-68 | 51 |
| Ethylene | 236 |

*Note that 190 grams of this mixture is the initial charge.
Pluronic is a trademark for use with surfactant compositions.

The initial distilled water mixture was adjusted to pH 4.3 with the citric acid. Ferric ammonium sulfate was added and the initial aqueous solution was added to the previously nitrogen purged 1 gallon reactor. Next, agitation at 200 rpm was begun and 190 grams of the monomer mixture was charged. The agitation was increased to 300 rpm and the mixture was heated to 55° C. The aqueous t-BHP and sodium erythorbate solutions were begun to be added at 0.2 ml/min and 0.4 ml/min, respectively. About 15 minutes after initiation occurred, the flows of the aqueous t-BHP and sodium erythorbate solutions were terminated. At this point, 140 gms of monomer mix and 121 grams of ethylene were added to a pressure of 500 psi. The aqueous t-BHP and sodium erythorbate solutions were again started, both at 0.4 ml/min. At reinitiation, the remaining monomer mixture feed was begun and the ethylene pressure was maintained at 500 psi for three hours. The aqueous t-BHP and sodium erythorbate solutions feeds were added uniformly over 3 hours. When the free vinyl acetate was less than 1.5%, the delay feeds were stopped. Next, the reaction was cooled to 30° C. and transferred to a degasser. During this transfer, the agitation rate in the degasser was 200 rpm and 2 gms Colloid 675 was added in a small amount of water.

Numerous properties of the resulting emulsion were measured and are set forth in Table 7 as follows:

TABLE 7

| | |
| --- | --- |
| Accel Seds % | 2.5 |
| Tg onset (deg C) | −6.1 |
| Viscosity (60/12 RPM) (cps) | 1156/3020 |
| 100/325 mesh grit (ppm) | 80/398 |
| % solids | 55.4 |
| pH | 4.4 |
| Dn (microns) | 0.15 |
| Dw/Dn | 1.7 |
| Toluene Insolubles % | 0.0 |
| Freeze Thaw Cycles | 0 |

EXAMPLE 10

Preparation Of VAE Terpolymer Emulsions For Coatings Stabilized With PEG/Diglycidyl Ether Of Bisphenol A The control procedure was repeated using the PEG/diglycidyl ether of the Bisphenol A Adduct of Example 1 as a stabilizer instead of the Igepal/Natrosol mixture utilized in the initial charge in forming the Control Latex of Example 9. Thus, the following components were added in the initial charge:

Igepal® CO-887 (37.2 gms),

Igepal® CO-630 (8.9 gms) and

Carbowax® PEG Compound 20M (23.4 gms).

Emulsion properties are shown in Table 8 below.

TABLE 8

| | |
| --- | --- |
| Accel Seds % | 3.0 |
| Tg onset (deg C) | −1.2 |
| Viscosity (60/12 RPM) (cps) | 960/1850 |
| 100/325 mesh grit (ppm) | 60/420 |
| % solids | 54 |
| pH | 5.1 |
| Dn (microns) | 0.13 |
| Dw/Dn | 1.6 |
| Toluene Insolubles % | 64 |
| Freeze Thaw Cycles | 0 |

The results show the utility of PEG/diepoxide adducts as successful stabilizers for VAE smaller particle size coating latices.

EXAMPLE 11

Preparation Of A Low VOC Interior Eggshell Enamel

The control and experimental emulsions of Examples 9 and 10 were used as the latex emulsions in the coating formulation in Table 10.

TABLE 10

| Formulation Low VOC Interior Eggshell Enamel | | | grams | | |
|---|---|---|---|---|---|
| Grind Paste: | Water | | 50.00 | | |
| | Tamol® 731 | | 2.50 | | |
| | Surfynol® surfactant TG | | 0.50 | | |
| | Kathon® biocide LX 1.5% | | 0.25 | | |
| | Colloid 640 | | 0.75 | | |
| | Potassium Carbonate | | 1.25 | | |
| | Ti-Pure® R-900 titanium dioxide | | 56.25 | | |
| | SpaceRite® S-11 | | 5.00 | | |
| | Atomite® | | 27.50 | | |
| | Colloid® 640 | | 0.50 | | |
| | Water | | 31.25 | | |
| | | Latex % Solids | | | |
| Letdown | Grind Paste (from above) | | 175.75 | 175.75 | |
| | Water (12.5gms.@55%) | | 13.76 | 12.34 | |
| | Emulsion (grams): | | | | |
| | Example 9 Control | 55.8 | 86.32 | | |
| | Example 10 | 54.9 | | 87.74 | |
| | Polyphobe® 9831 | | 3.00 | 3.00 | |

PVC: 23.8
Volume % solids: 34
Weight % solids: 48.2
Weight per gallon: 10.71
VOC (g/L): 0

The coating formulation was tested in conventional manner. Table 11 sets forth the results.

TABLE 11

| PERFORMANCE OF COATING | Ex 9 | Ex 10 |
|---|---|---|
| Viscosity: 24hr. KU | 99 | 93 |
| 20 Gloss | 2.0 | 1.5 |
| 60 Gloss | 12.5 | 6.2 |
| 85 Sheen | 45.0 | 35.8 |
| Reflectance | 93.4 | 93.5 |
| Contrast Ratio | 0.9657 | 0.9497 |
| Freeze/Thaw (# cycles) | Fail (5) | Fail (5) |
| Block Resistance (ASTM D4946-89) 6 mil. | | |
| 24 Hr. Dry - 1 hour R.T. 50% RH | Very tacky; no seal; poor to fair; 4 | Trace tack; excellent; 9 |
| 24 Hr. Dry - 6 hours R.T. 50% RH | 75–100% Seal; very poor; 0 | Slight tack; good; 6 |
| 24 Hr. Dry - 24 hours R.T. 50% RH | 75–100% Seal; very poor; 0 | Moderate tack; fair; 5 |
| 7 Day Dry - 30 min. 120 F. | 75–100% Seal; very poor; 0 | 5–25% Seal; poor; 3 |
| Block Resistance (ASTM D4946-89) 3 mil. | | |
| 24 Hr. Dry - 1 hour R.T. 50% RH | 5–25% Seal; poor; 3 | No tack; perfect; 10 |
| 24 Hr. Dry - 6 hours R.T. 50% RH | 75–100% Seal; very poor; 0 | Slight tack; good; 6 |
| 24 Hr. Dry - 24 hours R.T. 50% RH 7 Day Dry - 30 min. 120 F. (2/11/98) | 75–100% Seal; very poor; 0 | 5–25% Seal; poor; 3 |
| Scrub (3 Day Dry/Nylon brush) | 4200 | 540 |

These latices when incorporated into a low VOC eggshell or semi-gloss paint formulation also displayed a low minimum film forming temperature (MFFT) and simultaneous block resistance. In addition, freeze-thaw stability, high resistance to scrubbing and wet adhesion may be shown.

What is claimed is:

1. In a vinyl acetate based emulsion formed by emulsion polymerizing a monomer system comprising vinyl acetate, thereby forming a vinyl acetate-based polymer, said polymerizing effected in the presence of a stabilizer, the improvement which comprises:
   said emulsion consisting essentially of said vinyl acetate-based polymer,
   said stabilizer consisting essentially of a condensation product based upon the reaction product of a polyalkylene glycol and a diepoxide, and,
   said stabilizer is present in the emulsion in an amount of from 1 to 10% by weight of the monomer system.

2. The vinyl acetate based emulsion of claim 1 wherein the polyalkylene glycol is a polyethylene glycol.

3. The vinyl acetate based emulsion of claim 2 wherein the polyethylene glycol has a weight average molecular weight of from 500 to 10,000 grams/mole.

4. The vinyl acetate based emulsion of claim 3 wherein the diepoxide is the diglycidyl ether of a polyhydric alcohol.

5. The vinyl acetate based emulsion of claim 4 wherein the polyhydric alcohol is Bisphenol A or Bisphenol F.

6. The vinyl acetate based emulsion of claim 3 wherein the monomer system is comprised of vinyl acetate and ethylene and the stabilizer is present in an amount of from 3 to 7% by weight of the vinyl acetate-based polymer.

7. The vinyl acetate based emulsion of claim 6 wherein the vinyl acetate is present in an amount of from 70 to 95% by weight and the ethylene is present in an amount of from about 5 to 30% by weight.

8. The vinyl acetate based emulsion of claim 7 wherein the diepoxide is the diglycidyl ether of Bisphenol A and the molecular weight of the polyethylene glycol is from 3000 to 8000 grams/mole.

9. In a vinyl acetate based emulsion formed by emulsion polymerizing a monomer system comprising vinyl acetate, thereby forming a vinyl acetate-based polymer, said polymerizing effected in the presence of a stabilizer, the improvement which comprises a stabilizer consisting essentially of a condensation product based upon the reaction product of a polyalkylene glycol and a diepoxide, said stabilizer represented by the formula:

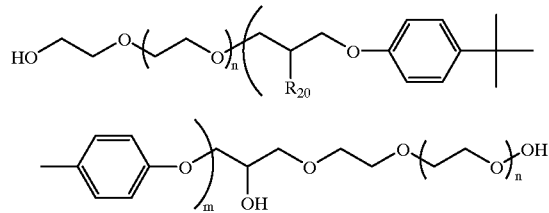

where n=ca. 150–200 and m=ca. 1 to yield a total weight average molecular weight of approximately 17,500 g/mole and the emulsion consists essentially of said vinyl acetate-based polymer as the polymeric component.

* * * * *

UNITED STATES PATENT AND TRADEMARK OFFICE
CERTIFICATE OF CORRECTION

PATENT NO : 6,124,397

DATED : 26 September 2000

INVENTOR(S) : Carrington Duane Smith

It is certified that error appears in the above-identified patent and that said Letters Patent are hereby corrected as shown below:

In Column 4, starting on line 1, the formula should read:

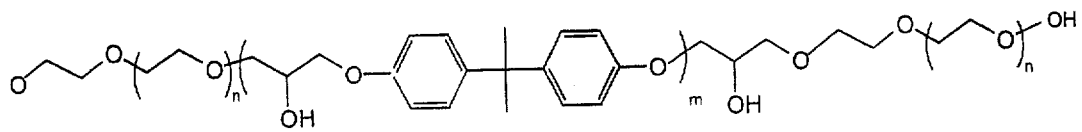

And in Column 14, starting on line 5, the formula should read:

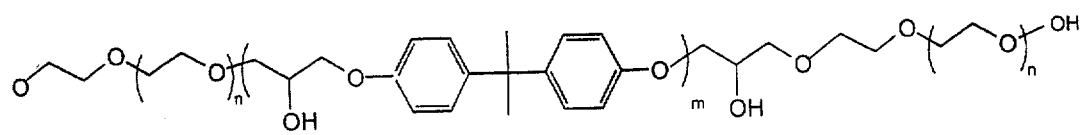

Signed and Sealed this

Twenty-fourth Day of April, 2001

Attest:

NICHOLAS P. GODICI

Attesting Officer

Acting Director of the United States Patent and Trademark Office